Oct. 4, 1927.

C. B. SPASE 1,644,548

CLUTCH CONSTRUCTION

Filed Nov. 11, 1924

INVENTOR.
Charles B. Spase.
BY Parsons & Bodell
ATTORNEYS.

Oct. 4, 1927.

C. B. SPASE 1,644,548

CLUTCH CONSTRUCTION

Filed Nov. 11, 1924     2 Sheets-Sheet 2

INVENTOR.
Charles B. Spase.
BY Parsons & Bodell
ATTORNEYS.

Patented Oct. 4, 1927.

1,644,548

UNITED STATES PATENT OFFICE.

CHARLES B. SPASE, OF SYRACUSE, NEW YORK, ASSIGNOR TO BROWN-LIPE GEAR COMPANY, OF SYRACUSE, NEW YORK, A CORPORATION OF NEW YORK.

CLUTCH CONSTRUCTION.

Application filed November 11, 1924. Serial No. 749,161.

This invention relates to friction clutches having a pressure member or ring to which the pressure is applied to engage the clutch through operating mechanism including a plurality of motion transmitting parts or levers and has for its object a particularly simple and efficient arrangement of the spring means used to engage the clutch through such motion transmitting parts whereby the spring pressure is applied to the pressure member substantially equally throughout the pressure area thereof. Other objects appear throughout the specification.

The invention consists in the novel features and in the combinations and constructions hereinafter set forth and claimed.

In describing this invention, reference is had to the accompanying drawings in which like characters designate corresponding parts in all of the views.

Figure 1:
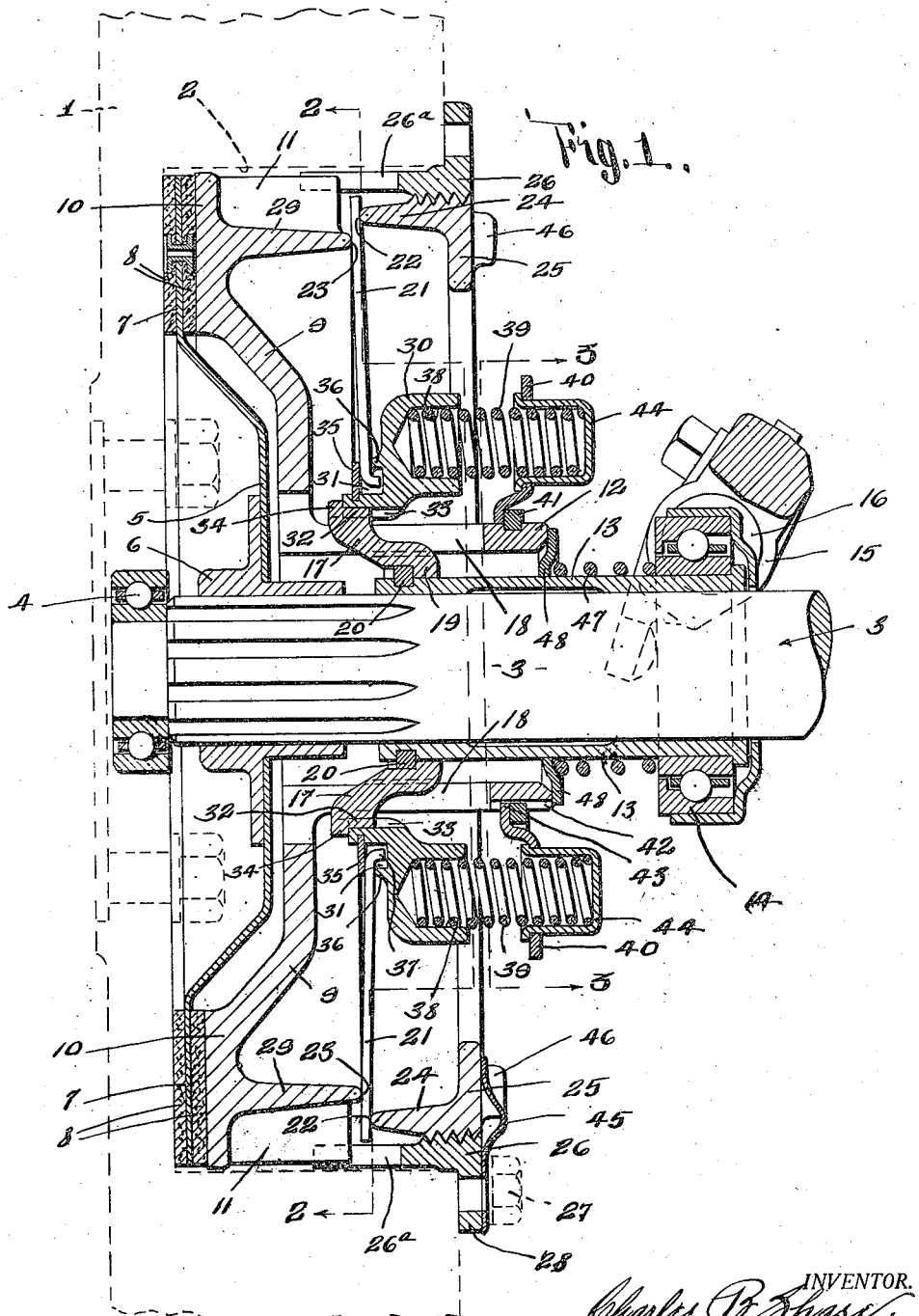
Figure 1 is a vertical sectional view of a clutch embodying my invention.
Figure 2:
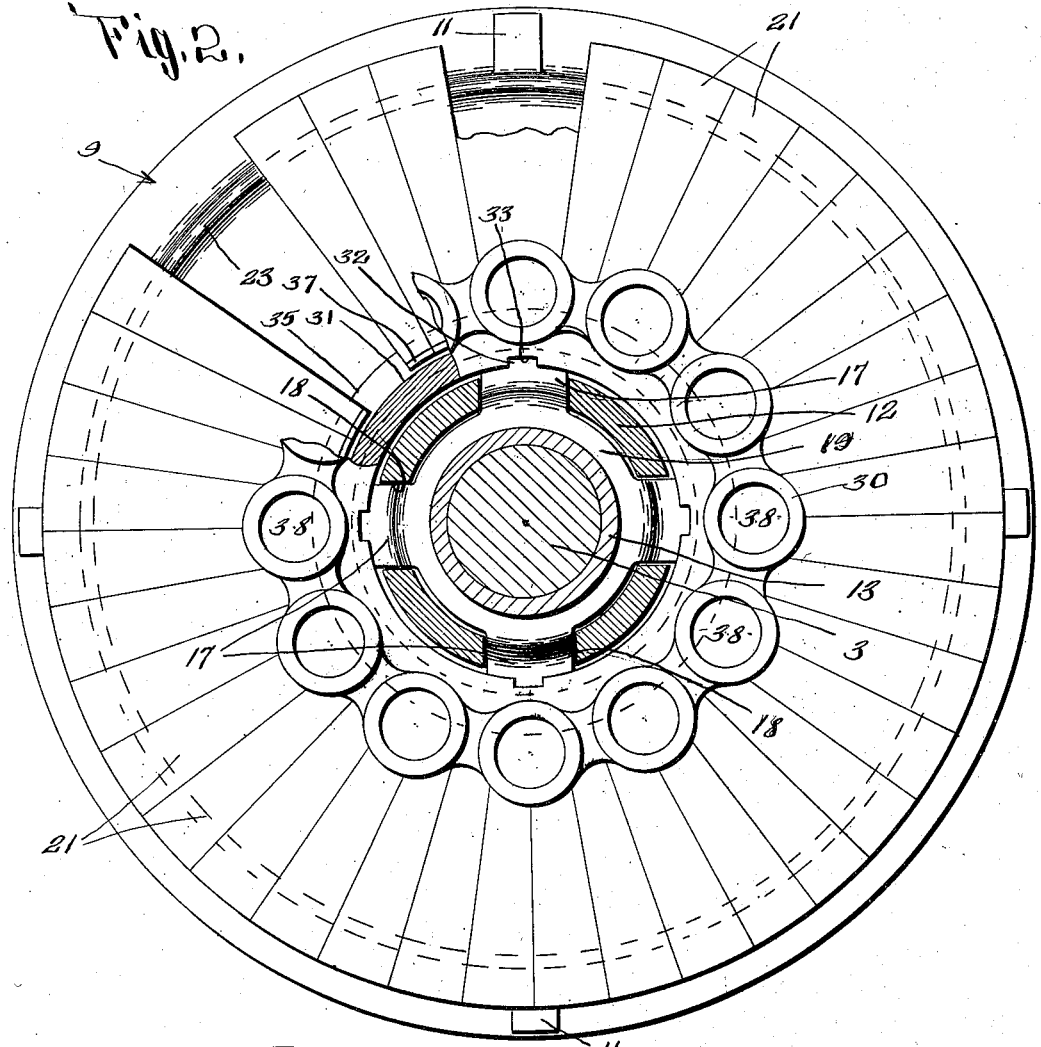
Figure 2 is a section taken approximately on line 2—2, Fig. 1.
Figure 3:
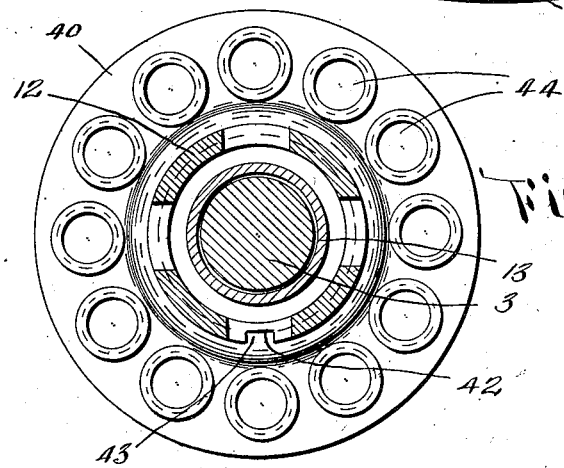
Figure 3 is a sectional view on line 3—3, Fig. 1.

In friction clutches as multiple disk clutches, a plurality of springs is sometimes used to act directly upon the pressure member which compresses the disks to engage them in driving relation. In friction clutches having small friction face area compared with multiple disk clutches, and in which the spring pressure is multiplied through levers, as so called single plate clutches, the clutch is engaged by a single spring acting through motion transmitting parts, as levers, which multiply or increase the power of the spring pressure, such spring being a single spring acting on all the motion transmitting parts or levers and being arranged coaxially with the clutch.

This invention comprises a friction clutch having a friction ring which is operated through a plurality of motion transmitting parts or levers which distribute and multiply the spring power and a plurality of springs, as an annular series of springs acting on such parts or levers substantially equally so that the pressure is applied to the pressure member substantially equally throughout its annular or engaging surfaces and hence the engagement of the clutch is equal throughout the relatively small friction surface, in contra-distinction to more at some points than at others.

In so called single plate clutches in which the friction surface is comparatively small, the equal application of the pressure throughout the fricton surface is of highest importance in order to obtain an efficient and non-slipping operation of the clutch.

This clutch comprises, generally, driving and driven elements, one of which includes a pressure member or ring which is movable axially, operating means including, what for brevity's sake, is called a throw-out collar, operator-operated in one direction by a lever or clutch pedal to disengage the clutch and in the other direction by spring means to engage the clutch, a plurality of like motion transmitting parts, as levers extending in a general direction outwardly from the throw-out collar and coacting with the pressure member or ring, and spring means acting on such parts to apply the pressure substantially equally to all of said parts and hence to apply pressure substantially equally to the pressure member or ring throughout the circle or pressure area of the pressure ring.

1 designates the driving element which is usually the fly wheel of an internal combustion engine, the fly wheel being usually provided with a cylindrical recess 2 opening through its rear face. The driven element comprises a shaft 3 arranged coaxially with the driving element 1 and usually having a pilot bearing at 4 therein, a friction member or plate 5 having a hub 6 slidably keyed or splined to the shaft 3 and also an annular portion 7 opposed to the bottom of the recess 2, such annular portion being provided with friction plates or disks 8 on opposite sides thereof. The driving element further comprises an axially movable pressure member 9 having an annular portion 10 opposed to the ring or annular portion 8 of the plate 5, and means for operating the pressure member 9. The pressure member 9 is connected to the driving element 1 to rotate therewith and when the clutch is disengaged to rotate relatively to the shaft 3, it being here shown as having a radial flange or key 11 interlocked with the fly wheel 1 as will be hereinafter described.

As here shown the pressure member 9 is formed with a hub 12 enclosing or arranged concentric with the shaft 3 and spaced apart from the periphery of such shaft.

The operating means includes a throw-out collar or sleeve 13 slidable axially of the shaft 3 within the hub 12 and having a throw-out bearing 14 at its rear end with which coacts the yoke 15 suitably mounted on a rock shaft 16 on which the usual clutch pedal is mounted, motion transmitting means between this throw-out collar 13 and the pressure ring 9, and an annular series of springs arranged to act on the motion transmitting parts so that the pressure of the spring means is transmitted substantially equally to said ring throughout the circle thereof. The spring means as will be understood acts oppositely to the yoke 15 which is operated by the clutch pedal, and normally acts to hold the clutch engaged.

The throw-out collar or sleeve 13 is here shown as having associated therewith outwardly extending arms 17 which extend through lengthwise slots 18 in the hub 12 of the pressure member 9, these arms 17 being provided on a ring 19 thrusting against a lock ring or shoulder 20 arranged in a peripheral groove at the inner end of the throw-out sleeve 13. The lock ring may be of any well known form, size and construction.

The motion transmitting parts between the throw-out collar and the pressure ring comprise a plurality of outwardly extending levers 21 connected at their inner ends to the throw-out collar to partake of the movement thereof and fulcrumed at 22 near their outer ends and thrusting at 23 between their ends and near their outer fulcrum points, on bearings provided on the pressure ring 9. As here shown the fulcrum 22 is annular in form and provided on an inwardly extending annular flange 24 formed on a ring or back plate 25 adjustably secured to the driving element 1 to rotate therewith. Preferably, this ring or back plate 25 threads into a ring 26 secured to the driving element 1 at the entrance of the recess 2, as by screws 27 extending through a flange 28 on the ring 26 and into the driving element 1, such flange 28 lapping the rear face of the driving element 1. The ring 26 is provided with one or more slots 26ª for receiving the keys 11 of the pressure ring so that the pressure ring rotates with the driving element 1. The bearing 23 of the pressure ring against which the levers act, is here shown as the edge of a rearwardly extending annular flange 29 on the pressure ring 9 or the annular portion 10 thereof.

The levers 21 are connected at their inner ends to a spring abutment 30 movable with the throw-out collar 13, this spring abutment being annular in general form and surrounding the hub 12 of the pressure member 9 and interlocked with the arms 17 associated with the throw-out sleeve 13. This spring abutment 30 is illustrated as formed with a groove 31 for receiving the inner ends of the levers 21. As here illustrated, the arms 17 are provided with lengthwise tongues 32 interfitting in lengthwise slots 33 in the inner face of the annular spring abutment 30, the arms 17 having heads or shoulders 34 at their rear ends against which the rear end of the portion of the abutment 30 thrusts.

The groove 31 in which the inner ends of the levers 21 are arranged is provided by a ring 35 interlocked in the abutment 30 in any suitable manner and also the abutment 30 has an annular bearing flange 36 opposed to the ring 35. The inner ends of the levers 21 extend between the ring 35 and the flange 36 and are bent rearwardly as at 37 as a precaution against displacement of the levers out of the groove 31. The annular spring abutment 30 is formed with a plurality of sockets or recesses 38.

The construction of the levers 21 per se forms no part of this invention. The levers here shown are segments of a discoidal plate and preferably are arranged with the side edges of each contiguous to the side edges of the next levers.

39 designates the springs arranged in annular series, these springs having their inner ends arranged in the sockets 38 and their outer ends thrusting against a relatively fixed spring abutment here shown as carried by the rear end of the hub 12 of the pressure member 9. This fixed spring abutment comprises an annular plate or ring 40 encircling the rear end of the hub 12 and thrusting against a lock ring or shoulder 41 arranged in a peripheral groove in the hub 12, the hub 12 having a lengthwise slot 42 in which a tongue 43 on the ring 40 projects to lock the ring 40 and the hub 12 together so that they rotate as a unit.

Sockets in the form of thimbles 44 are arranged in openings in the ring 40 and the rear ends of the springs 39 are seated in such sockets.

Owing to the plurality of springs or an annular series of springs acting on the levers 21, the spring pressure is applied substantially equally throughout the pressure ring, so that the clutch is held engaged by friction distributed equally throughout the area of the pressure ring.

Preferably, there is one spring 39 for a plurality of levers 20, there being approximately forty levers and twelve springs in the illustrated embodiment of my invention.

The ring 25 is adjustable to take up for wear by turning it relatively to the ring 26. It is held in its adjusted position in any suitable manner as by a spring detent 45 carried by the ring 26 and extending between lugs as 46 on the ring 25, these lugs serving as a means for engaging the ring 25 to turn it.

The throw-out sleeve, ring 19 etc., are held from relative displacement and the throw-out sleeve returned rearwardly or caused to follow the yoke arms 15 by a relatively light spring 47 interposed between the throw-out bearing 14 and an abutment ring 48 thrusting against the rear end of the hub 12 of the pressure member.

Owing to the use of a plurality or annular series of springs acting through a plurality of levers 21, the pressure of the springs is applied equally throughout the annular bearing surface 23 of the pressure ring and hence the pressure ring 10 is engaged with a single plate and the single plate engaged with the driving element or the bottom of the recess 2 substantially equally throughout regardless of slight misalinement.

Owing to the arrangement of the springs, and the assembly of the spring abutments, the throw-out sleeve and the pressure ring, and the levers, these parts can be removed and replaced as a unit without the use of special tools and without releasing the tension of the springs. Such removal and replacement is desirable in order to renew the friction disks.

What I claim is:

1. In a friction clutch, the combination of driving and driven elements, one of said elements comprising an axially shiftable pressure member for engaging and disengaging the clutch and an axially located clutch shaft, operating means including an operator controlled throw-out member movable along the shaft, the pressure member being formed with a hub surrounding the shaft and provided with lengthwise slots toward its inner end, the throw-out member comprising a sleeve slidable on the shaft within the hub and having arms extending through the lengthwise slots, an annular abutment surrounding the hub and thrusting against said arms, a second abutment opposed to the first abutment and carried by said hub, a series of annular springs between the abutments and levers between the first mentioned abutment and the pressure member.

2. In a single plate clutch, including an annular pressure ring having a hub formed with lengthwise slots, a shaft extending through the hub, a throw-out collar slidable on the shaft within the hub, and outwardly extending arms on the throw-out collar extending through the slots in the hub, the combination of a spring abutment thrusting against said arms, a second spring abutment on the hub and opposed to the former spring abutment, springs interposed between the abutments, and motion transmitting parts between the throw-out collar and the pressure ring.

3. In a single plate clutch, including an annular pressure ring having a hub formed with lengthwise slots, a shaft extending through the hub, a throw-out collar slidable on the shaft within the hub, outwardly extending arms on the throw-out collar extending through the slots in the hub, a spring abutment thrusting against said arms, a second spring abutment on the hub and opposed to the former spring abutment, an annular series of springs interposed between the abutments, and a plurality of like motion transmitting means between the throw-out collar and the pressure ring.

4. In a single plate clutch, including an annular pressure ring having a hub formed with lengthwise slots, a shaft extending through the hub, a throw-out collar slidable on the shaft within the hub, and having outwardly extending arms extending through the slots in the hub, the combination of opposing spring abutments carried respectively by said arms and by the hub, and an annular series of springs between the spring abutments, and outwardly extending levers connected at their inner ends to the throw-out collar, and coacting at their outer ends with the pressure ring.

5. In a single plate clutch, including an annular pressure member having a hub formed with lengthwise slots, a shaft extending through the hub, a throw-out collar slidable on the shaft within said hub and being provided with outwardly extending arms extending through the slots in the hub, a plurality of motion transmitting parts extending outwardly relatively to the throw-out collar and coacting with the pressure ring, opposing spring abutments coacting respectively with the throw-out collar and with said hub, an annular series of springs between the spring abutments, said abutments, springs, and motion transmitting parts being self-contained with the throw-out collar and the pressure member, whereby the pressure member and throw-out collar are removed as a unit without upsetting the springs.

6. In a friction clutch, the combination of driving and driven elements, one of said elements comprising an axially shiftable pressure member for engaging and disengaging the clutch and an axially located clutch shaft and operating means including a throw-out member movable along the shaft, the pressure member having a hub enclosing a portion of the throw-out member and the throw-out member and the hub having relative axial movement, a spring abutment surrounding the hub and thrusting against the throw-out member, motion transmitting levers between the abutment and the pressure member, a second abutment carried by the hub and an annular series of springs between the abutments.

In testimony whereof, I have hereunto signed my name, at Syracuse, in the county of Onondaga, and State of New York, this 27th day of October, 1924.

CHARLES B. SPASE.